US007705840B2

(12) United States Patent
Wei et al.

(10) Patent No.: US 7,705,840 B2
(45) Date of Patent: Apr. 27, 2010

(54) DISPLAY PANELS

(75) Inventors: Chun-Ching Wei, Taipei (TW); Hung-Hsiao Lin, Miaoli County (TW); Kun-Hong Chen, Taipei County (TW); Yang-En Wu, Taipei (TW)

(73) Assignee: Au Optronics Corp., Hsinchu (TW)

( * ) Notice: Subject to any disclaimer, the term of this patent is extended or adjusted under 35 U.S.C. 154(b) by 933 days.

(21) Appl. No.: 11/456,596

(22) Filed: Jul. 11, 2006

(65) Prior Publication Data

US 2007/0070017 A1 Mar. 29, 2007

(30) Foreign Application Priority Data

Sep. 26, 2005 (TW) ............................. 94133329 A

(51) Int. Cl.
*G06F 3/038* (2006.01)

(52) U.S. Cl. ..................................................... 345/204

(58) Field of Classification Search ........... 345/98–100, 345/204

See application file for complete search history.

(56) References Cited

U.S. PATENT DOCUMENTS 5,754,160 A * 5/1998 Shimizu et al. ............. 345/103
2002/0047822 A1 * 4/2002 Senda et al. .................. 345/90
2003/0193490 A1 * 10/2003 Liu et al. .................... 345/204

FOREIGN PATENT DOCUMENTS

CN 1458641 11/2003

* cited by examiner

*Primary Examiner*—Richard Hjerpe
*Assistant Examiner*—Carolyn R Edwards
(74) *Attorney, Agent, or Firm*—Thomas, Kayden, Horstemeyer & Risley

(57) ABSTRACT

Display panels capable of eliminating reliability issues due to high switching frequency. The display panel comprises a data driver outputting first, second, third and fourth data signals in sequence through a data line, a scan driver outputting first and second scan signals in sequence through first and second scan lines and an auxiliary driver generates first and second auxiliary signals in sequence, and first and second display cells commonly receives the first scan signal through the first scan line and receives the first and the second data signal through the data line, and a first switch is coupled to the data line and the second display cell, turning on and off in sequence according to the first auxiliary signal when the first scan signal is applied thereto such that the second and the first display cells receive the first and the second data signals in sequence.

7 Claims, 6 Drawing Sheets

DISPLAY PANELS

BACKGROUND OF THE INVENTION

1. Field of the Invention

The invention relates to display devices, and in particular to a display panel capable of reducing number of data signal driving IC.

2. Description of the Related Art

FIG. 1 is a diagram showing a conventional display driving circuit 10. It includes two data drivers 121 and 122, a scan driver 11, a pixel matrix comprising display cells 13, and switches 161 and 162 comprising transistors. Each display cell 13 in the odd columns of the pixel matrix receives a data signal through a data line 151 from the data driver 121 or 122. Each display cell 13 in the even columns of the pixel matrix receives a data signal through a data line 152 from the data driver 121 or 122. The display cells 13 also receive scan signals through scan lines 14 from the scan driver 11. To reduce number of the data drivers, data lines 151 and 152 are respectively coupled to the display cells 13 in the odd and even column of the pixel matrix share the same data terminal as the data driver through the switches 161 and 162 controlled by signals SW1 and SW2. When one of the scan signals is applied, the odd and even display cells 13 in the scanned row of the matrix receive the data signal output from the same terminal of the data driver 121 or 122 by turns. In FIG. 1, for example, the number of the data drivers is half that when not using the switches to share the data terminals since each data terminal provides the data signals to two columns of display cells of the pixel matrix.

However, in the conventional display driving circuit, the switching frequency of the switches 161 and 162 is n times the frame rate, wherein n is the number of the columns in the pixel matrix. For example, the switching frequency of the switches in a display having 768 pixel columns and a frame rate of 60 Hz is 46080 Hz. Such a switching frequency is much higher than that of the thin-film transistors (TFTs) used in the display cells 13. Besides, the high duty ratio and high current stress also degrades the reliability of the circuit.

BRIEF SUMMARY OF THE INVENTION

A detailed description is given in the following embodiments with reference to the accompanying drawings.

Embodiments of display panels are provided, in which a data driver outputs first, second, third and fourth data signals in sequence through a data line, a scan driver outputs first and second scan signals in sequence through first and second scan lines and an auxiliary driver generates first and second auxiliary signals in sequence. First and second display cells receive the first scan signal through the first scan line simultaneously and receive the first and the second data signals through the data line respectively, and a first switch is coupled to the data line and the second display cell, turning on and off in sequence according to the first auxiliary signal when the first scan signal is applied thereto such that the second display cell receives the first data signal and the first display cell receives the second data signal in sequence.

The invention also provides embodiments of a display panel, in which a data driver outputs first, second, third and fourth data signals in sequence through a data line, and first and second scan drivers output first and second scan signals in sequence through first and second scan lines. First and second display cells receive the first scan signal through the first scan line and the second scan line respectively and receive the first and the second data signal respectively through the data line simultaneously.

The invention also provides embodiments of electronic device, in which the disclosed display system is applied and a power supply powers the display system to display images.

The invention also provides embodiments of a driving method, in which a first auxiliary signal is applied to turn on a first switch such that a first data signal from a data line is transferred to first and second display cells and a first scan signal is applied to enable the first and the second display cells to receive the first data signal, during a first period. The first auxiliary signal is de-asserted to turn off the first switch such that the first display cell is electrically separated from the data line and the second display cell receives a second data signal from the data line according to the first scan signal, during a second period, in which the first switch is turned off until the first scan signal and the first auxiliary signal are applied at the same time again. A second auxiliary signal is applied to turn on a second switch such that a third data signal from the data line is transferred to third and fourth display cells and a second scan signal is applied to enable the third and the fourth display cells to receive the third data signal, during a third period. The second auxiliary signal is de-asserted to turn off the second switch such that the third display cell is electrically separated from the data line and the fourth display cell receives a fourth data signal from the data line according to the second scan signal, during a fourth period, in which the second switch is turned off until the second scan signal and the second auxiliary signal are applied at the same time again.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
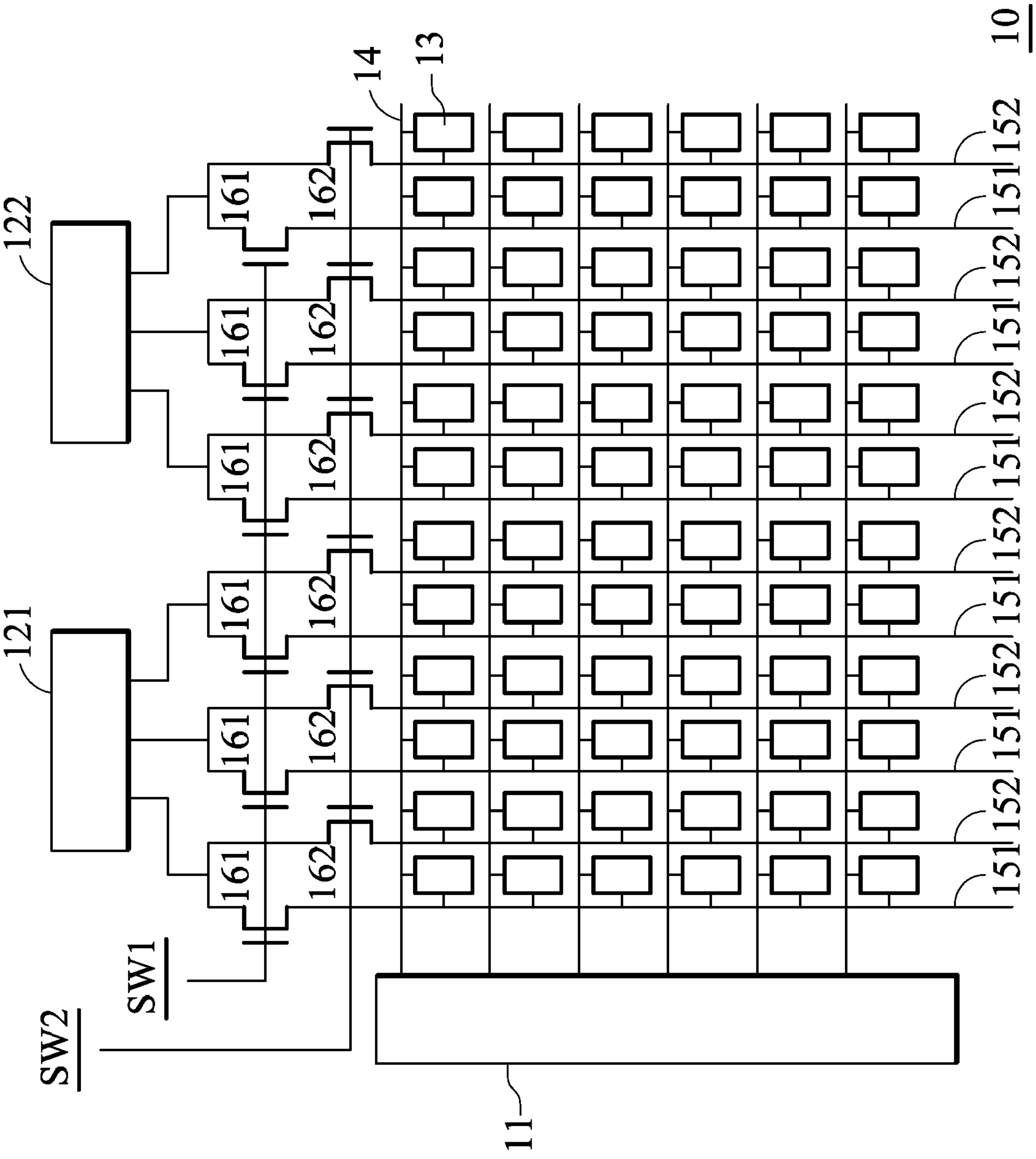
FIG. 1 (PRIOR ART)
FIG. 1 shows a conventional display driving circuit.
Figure 2A:
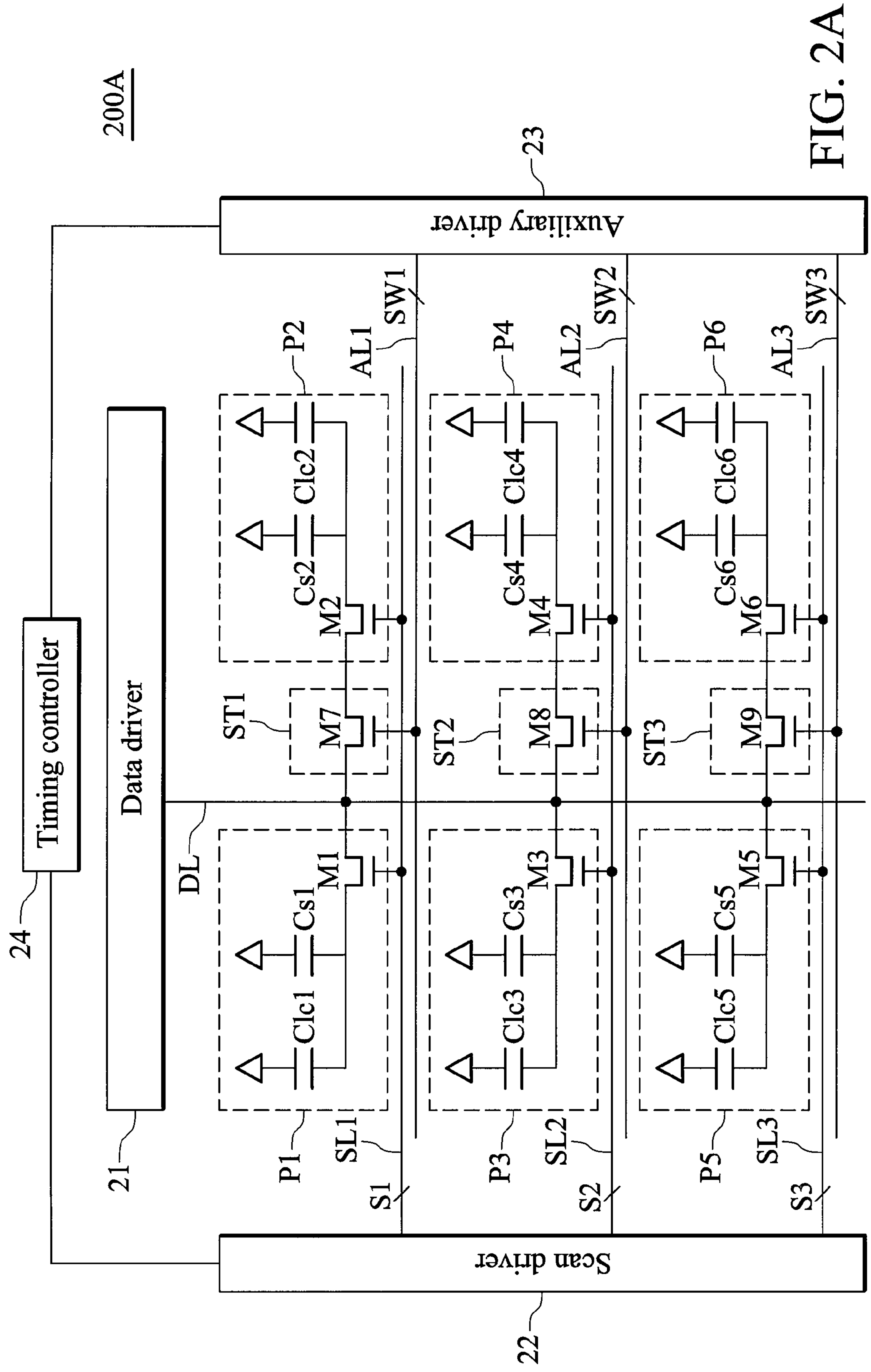
FIG. 2A shows an embodiment of a display panel of the invention.

FIG. 2A is a diagram showing a display panel 200A according to a first embodiment of the invention. It includes a data driver 21, a scan driver 22, an auxiliary driver 23, a timing controller 24, and a pixel matrix composed of six (for example) display cells P1~P6, and three switches ST1, ST2 and ST3. For example, the display panel 200A can be a liquid crystal display panel, a plasma display panel or an organic light emitting display panel, but is not limited thereto.

The data driver 21 outputs the desired data signals (not shown) for the six display cells P1~P6 through the data line DL. For example, the data driver 21 can be a data driving integrated circuit (IC) formed by single-crystal Si transistors, but is not limited thereto. The scan driver 22 outputs scan signals S1~S3 in sequence through the scan lines SL1~SL3. For example, the scan driver 22 can also be a scan driving integrated circuit (IC) formed by single-crystal Si transistors. The auxiliary driver 23 outputs auxiliary signals SW1~SW3 through auxiliary signal lines AL1~AL3. In the embodiment, the auxiliary driver 23 is a driving integrated circuit (IC) formed by a-Si transistors on the display panel rather than single-crystal Si transistors, and the data driver 21, the scan driver 22 and the auxiliary driver 23 are controlled by the timing controller 24.

The display cells P1 and P2 receive the scan signal S1 through the scan line SL1 simultaneously, the display cells P3 and P4 receive the scan signal S2 through the scan line SL2 simultaneously, and the display cells P5 and P6 receive the scan signal S3 through the scan line SL3 simultaneously. The display cells P1, P3 and P5 receive corresponding data signals respectively through the data line DL simultaneously, the display cells P2, P4 and P6 coupled to the switches ST1, ST2 and ST3 respectively, receiving corresponding data signals respectively through the data line DL simultaneously. The switches ST1, ST2 and ST3 are coupled between the data line DL and the display cell P2, between the data line DL and the display cell P4 and between the data line DL and the display cell P6 respectively.

As shown, the display cell P1 comprises a transistor M1 and a capacitor Cs1, the display cell P2 comprises a transistor M2 and a capacitor Cs2, and the display cells P3~P6 are similar to the display cells P1 and P2. Gates of the transistor M1, M3 and M5 are coupled to the scan lines SL1, SL2 and SL3 respectively, drains of which are coupled to the data line DL, and sources of which are coupled to capacitors Cs1, Cs3 and Cs5 respectively. Gates of the transistors M2, M4 and M6 are coupled to the scan lines SL1, SL2 and SL3 respectively, drains of which are coupled to the data line DL, and sources of which are coupled to capacitors Cs2, Cs4 and Cs6 respectively.

The switches ST1~ST3 are formed by transistors M7~M9, gates of the transistors M7~M9 are coupled to the auxiliary signals SW1~SW3 respectively, drains of which are coupled to the data line DL, sources of which are coupled to the display cells P2, P4 and P6 respectively. In the embodiment, the transistors M1~M9 are a-Si transistors, but are not limited thereto.

Figure 2B:
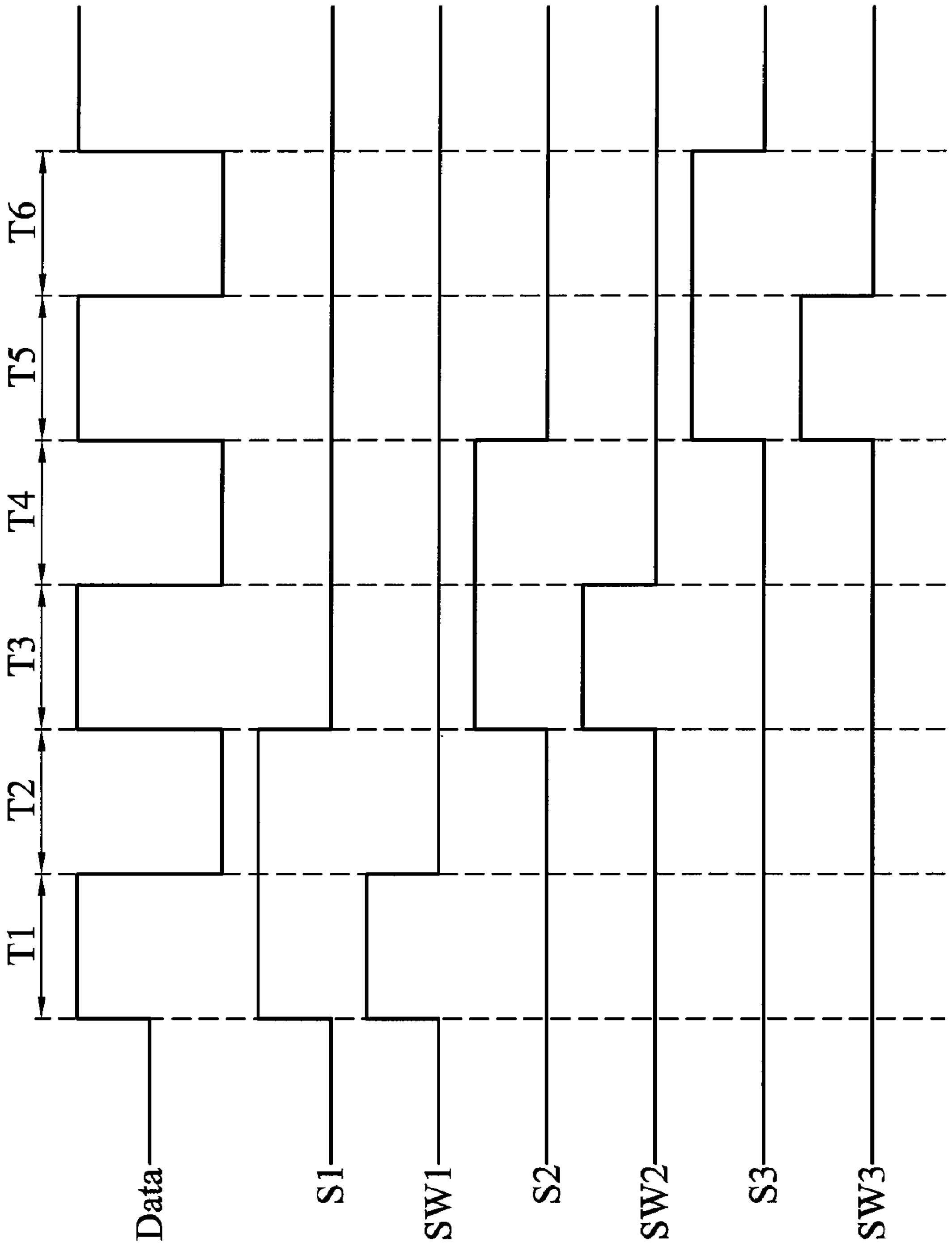
FIG. 2B is a timing chart of the display panel shown in FIG. 2A.

FIG. 2B is a timing chart of the display panel shown in FIG. 2A. The scan period when the scan signal S1 is applied (the scan signal S1 is asserted and has a logic high level) is divided into two sub-periods T1 and T2. The auxiliary signal SW1 turns on the transistor M7 (closes the switch ST1) and turns off the transistor M7 (the switch ST1 is opened) in sequence during the sub-periods T1 and T2 respectively, when the scan signal S1 is applied.

During the sub-period T1, during which the transistor M7 is turned on, the display cell P2 in the even column of the pixel matrix receives the data signal from the data driver 21 through the data line DL, and the display cell P1 in the odd column of the pixel matrix receives the data signal from the data driver 21 through the data line DL during the sub-period T2, during which the transistor M7 is turned off. For example, the data signal from the data driver 21 during the sub-period T1 can be a data signal with a positive polarity, and the data signal from the data driver 21 during the sub-period T2 can be a data signal with negative polarity, but are not limited thereto.

It should be noted that the display cell P1 can also receive the data signal for the display cell P2 during sub-period T1, but the data signal received by the display cell P1 is updated by the data signal on the data line DL during the sub-period T2. Further, during the period (T1 and T2), during which the scan signal S1 is applied, the switch ST1 only turns on and off once according to the auxiliary signal SW1 until the scan signal S1 is applied thereto again. Namely, the transistor M7 is turned off during the sub-period T2 and on again when the auxiliary signal SW1 is applied thereto again.

Next, when the scan signal S1 is de-asserted and the scan signal S2 is applied (has a logic high level), the transistors M1, M2 and M7 are turned off. The scan period when the scan signal S2 is applied and divided into two sub-periods T3 and T4. The auxiliary signal SW2 turns on the transistor M8 (closes the switch ST2) and turns off the transistor M8 (the switch ST2 is opened) in sequence during the sub-periods T3 and T4 respectively, when the scan signal S2 is applied.

During the sub-period T3, during which the transistor M8 is turned on, the display cell P4 in the even column of the pixel matrix receives the data signal from the data driver 21 through the data line DL, and the display cell P3 in the odd column of the pixel matrix receives the data signal from the data driver 21 through the data line DL during the sub-period T4, during which the transistor M8 is turned off. For example, the data signal from the data driver 21 during the sub-period T3 can be a data signal with a positive polarity, and the data signal from the data driver 21 during the sub-period T4 can be a data signal with negative polarity, but are not limited thereto.

It should be noted that the display cell P3 can also receive the data signal for the display cell P4 during sub-period T3, but the data signal received by the display cell P3 is updated by the data signal on the data line DL during the sub-period T4. Further, during the period (T3 and T4), during which the scan signal S2 is applied, the switch ST2 only turns on and off once according to the auxiliary signal SW2 until the scan signal S2 is applied thereto again. Namely, the transistor M8 is turned off during the sub-period T4 and on again when the auxiliary signal SW2 is applied thereto again.

Similarly, when the scan signal S2 is de-asserted and the scan signal S3 is applied (has a logic high level), the transistors M3, M4 and M8 are turned off. The scan period when the scan signal S3 is applied is divided into two sub-periods T5 and T6. The auxiliary signal SW3 turns on the transistor M9 (closes the switch ST3) and turns off the transistor M9 (the switch ST3 is opened) in sequence during the sub-periods T5 and T6 respectively, when the scan signal S3 is applied.

During the sub-period T5, during which the transistor M9 is turned on, the display cell P6 in the even column of the pixel matrix receives the data signal from the data driver 21 through the data line DL, and the display cell P5 in the odd column of the pixel matrix receives the data signal from the data driver 21 through the data line DL during the sub-period T6, during which the transistor M9 is turned off. For example, the data signal from the data driver 21 during the sub-period T5 can be a data signal with a positive polarity, and the data signal from the data driver 21 during the sub-period T6 can be a data signal with negative polarity, but are not limited thereto.

It should be noted that the display cell P5 can also receive the data signal for the display cell P6 during sub-period T5, but the data signal received by the display cell P5 is updated by the data signal on the data line DL during the sub-period T6. Further, during the period (T5 and T6), during which the scan signal S3 is applied, the switch ST3 only turns on and off once according to the auxiliary signal SW3 until the scan signal S3 is applied thereto again. Namely, the transistor M9 is turned off during the sub-period T6 and would be turned on again when the auxiliary signal SW3 is applied thereto again.

Namely, during a frame period, during which all the scan lines are scanned in sequence once, the auxiliary signals SW1~SW3 are only applied in sequence once such that switches ST1~ST3 are each switched once. Thus, the switching frequency of the switches ST1~ST3 is lowered to the frame rate, which eliminates the reliability issue in the conventional display panel.

The invention also provides a driving method for the display panel shown in FIG. 2A.

During a period T1, an auxiliary signal SW1 is applied to turn on a switch ST1 such that a data signal from a data line DL is transferred to display cells P1 and P2 and a scan signal S1 is applied to enable the display cells P1 and P2 to receive the data signal on the data line DL.

During a period T2, the auxiliary signal SW1 is de-asserted to turn off the switch ST1 such that the display cell P2 is electrically separated from the data line DL and the display cell P1 receives a data signal from the data line DL according to the scan signal S1, in which the witch ST1 is turned off until the scan signal S1 and the auxiliary signal SW1 are applied thereto again.

During a period T3, an auxiliary signal SW2 is applied to turn on a switch ST2 such that a data signal from the data line DL is transferred to display cells P3 and P4 and a scan signal S2 is applied to enable the display cells P3 and P4 to receive the data signal on the data line DL.

During a period T4, the auxiliary signal SW2 is de-asserted to turn off the switch ST2 such that the display cell P4 is electrically separated from the data line DL and the display cell P3 receives a data signal from the data line DL according to the scan signal S2, in which the switch ST2 is turned off until the scan signal S2 and the auxiliary signal SW2 are applied thereto again.

During a period T5, an auxiliary signal SW3 is applied to turn on a switch ST3 such that a data signal from the data line DL is transferred to display cells P5 and P6 and a scan signal S3 is applied to enable the display cells P5 and P6 to receive the data signal on the data line DL.

During a period T6, the auxiliary signal SW3 is de-asserted to turn off the switch ST3 such that the display cell P6 is electrically separated from the data line DL and the display cell P5 receives a data signal from the data line DL according to the scan signal S3, in which the switch ST3 is turned off until the scan signal S3 and the auxiliary signal SW3 are applied thereto again.

Namely, during a frame period, during which all the scan lines are scanned in sequence once, the auxiliary signals SW1~SW3 are only applied in sequence once such that the switches are ST1~ST3 each switched once. Thus, the switching frequency of the switches ST1~ST3 is lowered to the frame rate, which eliminates the reliability issue in the conventional display panel.

Figure 3A:
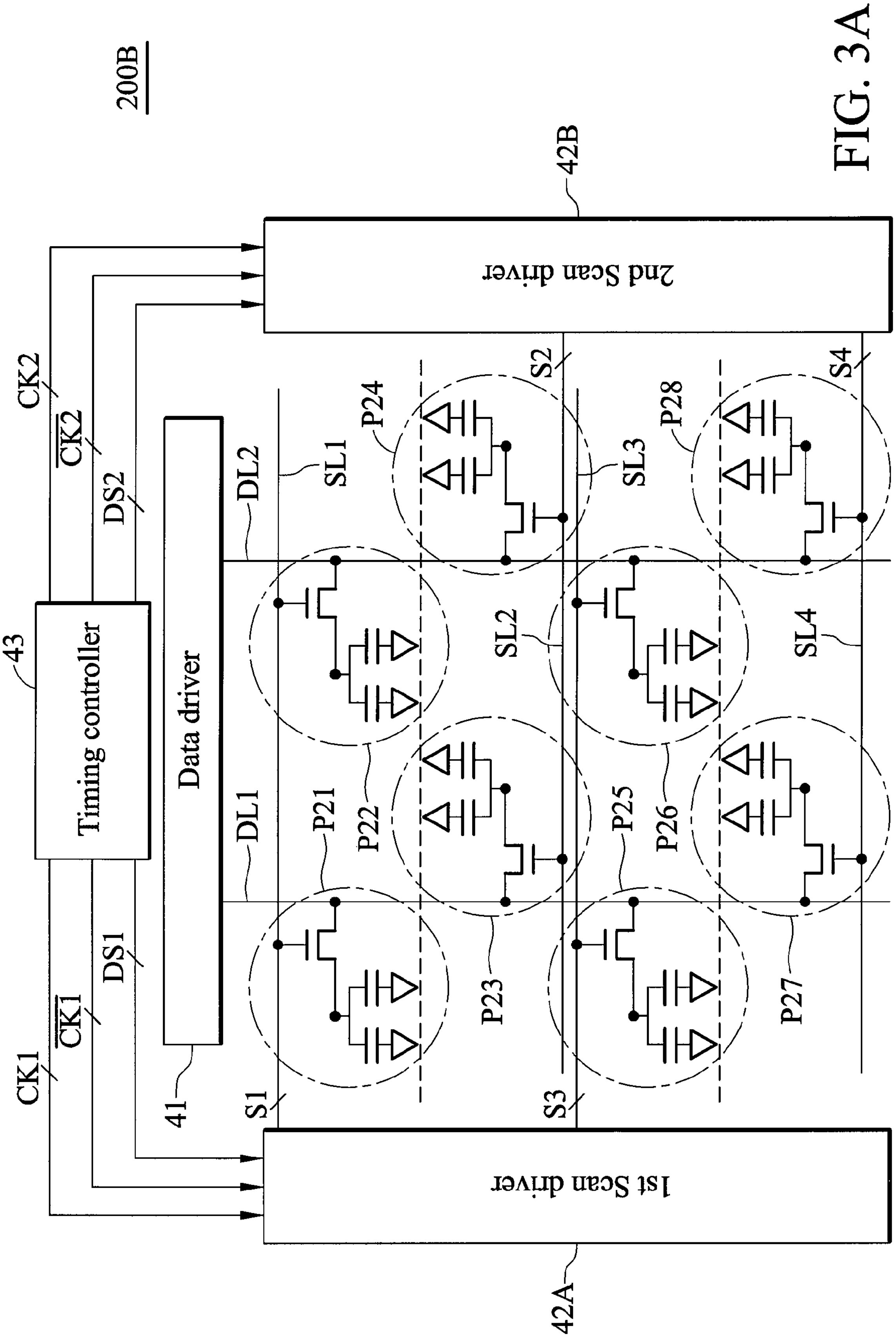
FIG. 3A shows another embodiment of display panel of the invention.

FIG. 3A shows another embodiment of a display panel 200B of the invention. It comprises a data driver 41, two scan driver 42A and 42B, a timing controller 43, and a pixel matrix composed of eight (for example) display cells P21~P28. For example, the display panel 200B can be a liquid crystal display panel, a plasma display panel or an organic light emitting display panel, but it is not limited thereto.

The data driver 41 outputs the desired data signals (not shown) for the eight display cells P21~P28 through data lines DL1 and DL2. For example, the data driver 41 can be a data driving integrated circuit (IC) formed by single-crystal Si transistors, but it is not limited thereto.

Figure 3B:
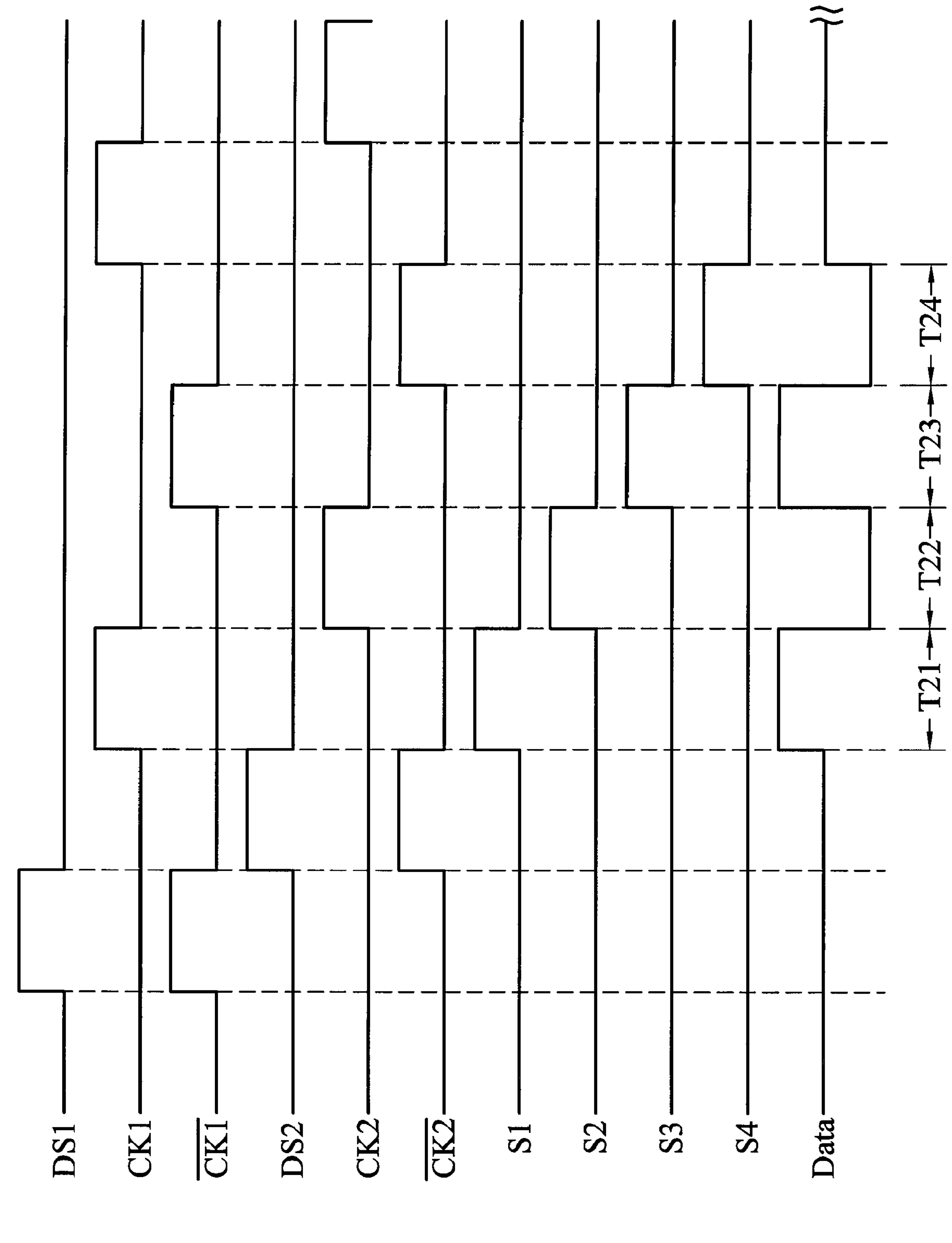
FIG. 3B is a timing chart of the display panel shown in FIG. 3A.

The data driver 41, the two scan drivers 42A and 42B are controlled by the timing controller 43. For example, the timing controller 43 provides a first set of control signals such as clock signals CK1 and /CK1 and enabling signal DS1 (as shown in FIG. 3B) /CK2 to the scan driver 42A and a second set of controls signals such as clock signals CK2 and and enabling signal DS2 (as shown in FIG. 3B) to the scan driver 42B.

The scan drivers 42A and 42B generate scan signals S1~S4 in sequence according to the first and second sets of control signals, and the scan driver 42A outputs the scan signals S1 and S3 through the scan lines SL1 and SL3 respectively and the scan driver 42B outputs the scan signals S2 and S4 through the scan lines SL2 and SL4 respectively. Namely, the scan signals S2 and S4 are not generated according to the scan signals S1 and S3, but generated by different scan drivers. In the embodiment, the scan driver 42A and 42B can also be a driving integrated circuit (IC) formed by a-Si transistors on the display panel rather than single-crystal Si transistors.

The display cells P21 and P22 receive the scan signal S1 through the scan line SL1 simultaneously, the display cells P23 and P24 receive the scan signal S2 through the scan line SL2 simultaneously, the display cells P25 and P26 receive the scan signal S3 through the scan line SL3 simultaneously, and the display cells P27 and P28 receive the scan signal S4 through the scan line SL4 simultaneously. The display cells P21, P23, P25 and P27 receive corresponding data signals respectively through the data line DL1 simultaneously, the display cells P22, P24, P26 and P28 receive corresponding data signals respectively through the data line DL2 simultaneously.

As shown, each display cell P21~P28 comprises a transistor, a storage capacitor and a liquid element, and the transistors in the display cells P21~P28 can be a-Si transistors, but are not limited thereto.

FIG. 3B is a timing chart of the display panel shown in FIG. 3A. During a period T21, a scan signal S1 is applied (the scan signal is asserted and has a logic high level), and the display cells P21 and P22 in the odd column of the pixel matrix receives the data signals from the data driver 41 through the data lines DL 1 and DL2.

During a period T22, a scan signal S2 is applied, and the display cells P23 and P24 in the even column of the pixel matrix receives the data signals from the data driver 41 through the data lines DL1 and DL2.

During a period T23, a scan signal S3 is applied, and the display cells P25 and P26 in the odd column of the pixel matrix receive the data signals from the data driver 41 through the data lines DL1 and DL2.

During a period T24, a scan signal S4 is applied, and the display cells P27 and P28 in the even column of the pixel matrix receive the data signals from the data driver 41 through the data lines DL1 and DL2. For example, the data signals output from the data driver 41 during the periods T21 and T23 can be data signals with a positive polarity and that output from the data driver 41 during the period T22 and T24 can be data signals with a negative polarity, but are not limited thereto.

Namely, all scan lines of the display panel 200B are scanned in sequence by the scan drivers 42A and 42B, and display cells in two columns share one data line to receive data signals from the data driver. As the switching frequency of the switches ST1~ST3 is lowered to the frame rate, the reliability issue in the conventional display panel can be eliminated.

Figure 4:
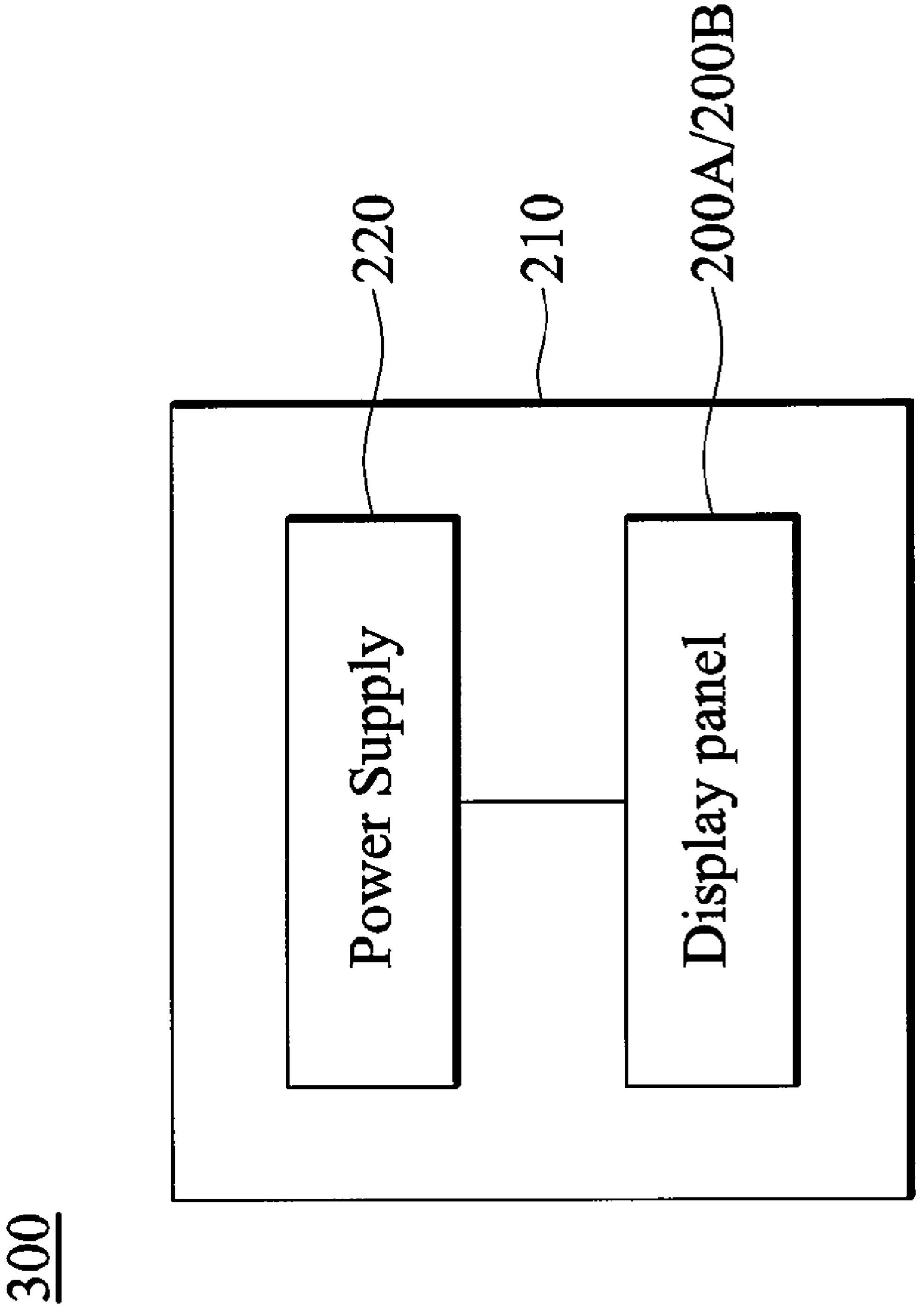
FIG. 4 is a schematic view showing an electronic device using display panels shown in FIGS. 2A and 3A.

FIG. 4 is a schematic view showing an electronic device using display systems shown in FIGS. 2A and 3A. As shown, the electronic device 300 comprises a housing 210, the display panel 200A/200B, and power supply 220. The power supply 220 is operationally coupled to the display panels

200A/200B to powers the display panel 200A/200B to display images. For example, the display panel 200A/200B can be a liquid crystal display panel, a plasma display panel or an organic light emitting display panel, and the electronic device 300 can be a PDA, a display monitor, a notebook computer, a table computer or a cellular phone.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display panel, comprising a data line;

a first and second scan lines;

a data driver for outputting a first, second, third and fourth data signals in sequence through the data line;

a scan driver for outputting a first and a second scan signals in sequence through the first and the second scan lines;

an auxiliary driver for generating a first and a second auxiliary signals in sequence;

a first and second display cells for receiving the first scan signal through the first scan line commonly and receiving the first and the second data signals through the data line respectively; and a first switch coupled to the data line and the second display cell, turning on and off in sequence according to the first auxiliary signal when the first scan signal is applied such that the second display cell receives the first data signal and the first display cell receives the second data signal in sequence, wherein after the first scan signal is applied, the first switch is turned on and off in sequence once until the first scan signal is applied thereto again, according to the auxiliary signal.

2. The display panel as claimed in claim 1, wherein the data driver and the scan driver comprise a driving integrated circuit (IC) formed by single-crystal Si.

3. The display panel as claimed in claim 1, further comprising:

a third and fourth display cells for receiving the second scan signal through the second scan line commonly and receiving the third and the fourth data signals through the data line respectively; and a second switch coupled to the data line and the fourth display cell, turning on and off in sequence according to the second auxiliary signal when the second scan signal is applied thereto such that the fourth display cell receives the third data signal and the third display cell receives the fourth data signal in sequence.

4. The display panel as claimed in claim 3, wherein, after the second scan signal is applied, the second switch is turned on and off in sequence once until the second scan signal is applied thereto again according to the second auxiliary signal.

5. The display panel as claimed in claim 4, wherein the first and the second switches are a-Si transistors, each of the switch comprising a gate receiving the first auxiliary signal and the second auxiliary signal respectively.

6. An electronic device, comprising:

a display panel as claimed in claim 1; and a power supply for powering the display panel to display images.

7. A method for driving a display panel, comprising:

applying a first auxiliary signal to turn on a first switch such that a first data signal from a data line is transferred to a first and second display cells and applying a first scan signal to enable the first and the second display cells to receive the first data signal, during a first period;

de-asserting the first auxiliary signal to turn off the first switch such that the first display cell is electrically separated from the data line and the second display cell receives a second data signal from the data line according to the first scan signal, during a second period, in which the first switch is turned off until the first scan signal and the first auxiliary signal being applied at the same time again;

applying a second auxiliary signal to turn on a second switch such that a third data signal from the data line is transferred to third and fourth display cells and applying a second scan signal to enable the third and the fourth display cells to receive the third data signal, during a third period; and de-asserting the second auxiliary signal to turn off the second switch such that the third display cell is electrically separated from the data line and the fourth display cell receives a fourth data signal from the data line according to the second scan signal, during a fourth period, in which the second switch is turned off until the second scan signal and the second auxiliary signal is applied at the same time again.

* * * * *